United States Patent [19]
Naito

[11] Patent Number: 5,964,819
[45] Date of Patent: Oct. 12, 1999

[54] VEHICLE YAWING BEHAVIOR CONTROL APPARATUS

[75] Inventor: Genpei Naito, Yokohama, Japan

[73] Assignee: Nissan Motor Co., Ltd., Yokohama, Japan

[21] Appl. No.: 08/669,706

[22] Filed: Jun. 24, 1996

[30]     Foreign Application Priority Data

Jun. 22, 1995  [JP]  Japan .................................. 7-156022

[51] Int. Cl.⁶ .............................. G06G 7/70; G06G 7/78
[52] U.S. Cl. ............................... 701/72; 701/74; 303/140
[58] Field of Search .................................. 701/70, 72, 74; 303/139, 140, 146, 147

[56]           References Cited

U.S. PATENT DOCUMENTS

| 5,229,944 | 7/1993 | Yasuno | 701/70 |
| 5,303,989 | 4/1994 | Yasuno et al. | 303/100 |
| 5,341,296 | 8/1994 | Yasuno et al. | 701/70 |
| 5,428,532 | 6/1995 | Yasuno | 701/48 |
| 5,710,705 | 1/1998 | Eckert | 701/72 |
| 5,711,023 | 1/1998 | Eckert | 701/70 |
| 5,742,918 | 4/1998 | Ashrafi et al. | 701/70 |
| 5,762,157 | 6/1998 | Uehara | 701/90 |

*Primary Examiner*—Virna Lissi Mojica
*Attorney, Agent, or Firm*—Foley & Lardner

[57]               ABSTRACT

A vehicle yawing behavior control apparatus for controlling the vehicle behavior to bring the actual vehicle yawing motion into agreement with the calculated target value calculated based on the parameters representing a condition of vehicle movement. At least vehicle yaw rate and slip angle representing an actual value of vehicle yawing motion is detected. When the detected vehicle slip angle is directed outside with respect to the vehicle movement and is greater than a reference slip angle, the calculated target vehicle yawing motion value is corrected outside with respect to the vehicle movement to a greater degree at a greater deviation of the detected vehicle slip angle from the reference slip angle. The reference slip angle is increased as the calculated target vehicle yawing motion value increases.

16 Claims, 9 Drawing Sheets

FIG.9B

VEHICLE YAWING BEHAVIOR CONTROL APPARATUS

BACKGROUND OF THE INVENTION

This invention relates to an apparatus for controlling the yawing behavior of an automotive vehicle supported on a pair of front road wheels and a pair of rear road wheels.

In general, drivers turn the vehicle in a circle with a feeling of vehicle position and direction, that is, vehicle slip angle (normally referred to as yaw angle). However, a satisfactory sensor for measuring vehicle slip angle is not available at this time. Because of this, it is the current practice to control the vehicle behavior by controlling the vehicle yaw rate to a target value, as disclosed in Japanese Patent Kokai Nos. 63-312271 and 4-334660. With such a conventional vehicle yawing behavior control, however, the vehicle behavior would be controlled in a direction to promote unstable vehicle behavior upon occurrence of vehicle lateral slip. In order to solve this problem, feedback control may be required not only for the vehicle yaw rate, but also for the vehicle slip angle. The vehicle slip angle feedback control is made, according to a deviation of the actual vehicle slip angle from a reference slip angle, to ensure that the actual vehicle slip angle is correct to maintain the reference slip angle. In this case, the yawing motion value M to be controlled is given as:

$$M = K1[(d/dt)\phi - (d/dt)\phi^*] + K2(Sa - Sa^*)$$

where $(d/dt)\phi$ is the actual vehicle yaw rate, $(d/dt)\phi^*$ is the target vehicle yaw rate, Sa is the actual vehicle slip angle, Sa* is the reference slip angle, and K1 and K2 are control constants. The term $K1[(d/dt)\phi - (d/dt)\phi^*]$ corresponds to the value Mb obtained by the feedback control of the vehicle yaw rate and the term $K2(Sa-Sa^*)$ corresponds to a value Ma obtained by the feedback control of the vehicle slip angle. The value Mb acts to produce a yawing motion inside with respect to the vehicle turning movement, and the value Ma acts to produce a yawing motion outside with respect to the vehicle turning movement. That is, the values Ma and Mb act in the opposite directions to cancel each other. For this reason, the conventional vehicle behavior control cannot stabilize the vehicle behavior to a sufficient extent.

SUMMARY OF THE INVENTION

It is a main object of the invention to provide a vehicle yawing behavior control apparatus which avoids promotion of unstable vehicle yawing behavior resulting from an unchanged target vehicle yawing motion value upon occurrence of lateral slip.

There is provided, in accordance with the invention, an apparatus for controlling the yawing behavior of an automotive vehicle supported on a pair of front road wheels and a pair of rear road wheels. The vehicle yawing behavior control apparatus comprises means for sensing parameters representing a condition of vehicle movement, means for calculating a target value for vehicle yawing motion based on the sensed parameters, means for detecting at least vehicle yaw rate and slip angle representing an actual value of vehicle yawing motion, and a control unit for controlling the vehicle behavior to bring the actual vehicle yawing motion value into agreement with the calculated target value. The control unit includes means for producing a control signal when the detected vehicle slip angle is directed outside with respect to a circle in which the vehicle is turning and is greater than a reference slip angle, means responsive to the control signal for correcting the calculated target vehicle yawing motion value to a greater degree outside with respect to the circle in which the vehicle is turning as a deviation of the detected vehicle slip angle from the reference slip angle increases, and means for increasing the reference slip angle as the calculated target vehicle yawing motion value increases.

BRIEF DESCRIPTION OF THE DRAWINGS

This invention will be described in greater detail buy reference to the following description taken in connection with the accompanying drawings, in which like reference numerals identify like elements in the several figures and in which.

DETAILED DESCRIPTION OF THE INVENTION

Figure 1:
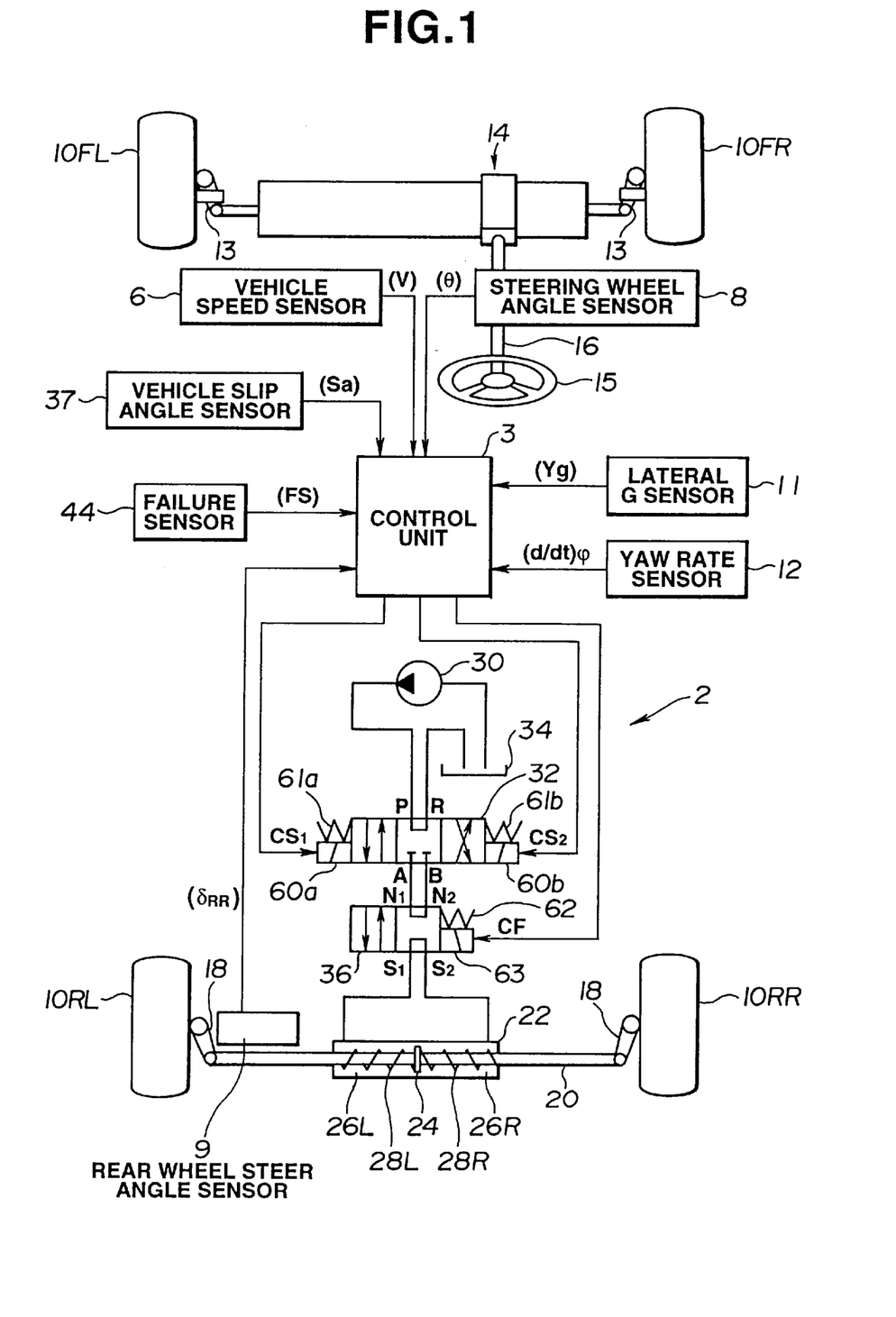
FIG. 1 is a schematic diagram of a vehicle yawing behavior control apparatus embodying the invention.

With reference to the drawings and, in particular to FIG. 1, there is shown a schematic diagram of a four-wheel steering apparatus to which the vehicle yawing behavior control apparatus of the invention is applicable. The four-wheel steering apparatus is used with an automotive vehicle supported on a pair of steerable front road wheels 10FL and 10FR and a pair of steerable rear road wheels 10FL and 10RR. Each of the front road wheels 10FL and 10FR is borne on a hub carrier supported for swinging motion in a horizontal plane with respective to the vehicle. The front road wheel hub carriers are connected through respective tie rods 13 to the rack shaft of a rack and pinion type steering gear 14 which includes a pinion held in mesh engagement with the rack shaft. The pinion is coupled through a steering shaft 16 to a steering wheel or handle 15. The link mechanism, which couples the front road wheels 10FL and 10FR to the steering wheel 15, steers the front road wheels 10FL and 10FR at an angle θ in response to the angle θ of rotation of the steering wheel 15 with respect to its neutral or straight-ahead position.

The rear road wheels 10RL and 10RR are borne on respective hub carriers which are connected through respective tie rods 18 to a steering shaft 20. The steering shaft 20 serves as the piston rod of a double-rod, double-acting type cylinder 22. The steering shaft 20 has a piston 24 fixed thereon for rotation in unison with the steering shaft 20 within the cylinder 22 to define two chambers 26L and 26R on the opposite sides thereof. Thus, the stroke of reciprocal motion of the steering shaft 20 is determined by the difference between the pressures of the fluid introduced into the left and right chambers 26L and 26R. Springs 28L and 28R are placed in the respective chambers 26L and 26R to urge the piston 24 in the opposite directions. The springs 28L and 28R have the same elastic coefficient and same free length so that the piston 24 returns to the center of the cylinder 22 so Sa to return the rear road wheels 10RL and 10RR to their neutral positions when the fluid pressures in the respective chambers 26L and 26R are released. The rear road wheels 10RL and 10RR are turned in a first direction at an angle δr proportional to the fluid pressure introduced into the first pressure chamber 26L with respect to the vehicle longitudinal axis. The rear road wheels 10RL and 10RR are turned in a second, opposite direction at an angle δr proportional to the fluid pressure introduced into the second pressure chamber 26R with respect to the vehicle longitudinal axis. The first and second pressure chambers 26L and 26R are connected to the respective output ports S1 and S2 of a cutoff valve 36. The cutoff valve 36 has inlet ports N1 and N2 connected to the respective outlet ports A and B of a control valve 32. The control valve 32 controls the flow of working fluid to the cylinder 22 through the cutoff valve 36 from a pressure source including a hydraulic pump 30 and a reservoir 34. The control valve 32 has an inlet port P connected to the hydraulic pump 30 and another inlet port R connected to the reservoir 34. The hydraulic pump 30 is driven by the engine to supply working fluid from the reservoir 34 to the inlet port P of the control valve 32.

The control valve 32 is shown as a spring center type solenoid change-over valve having first and second solenoids 60a and 60b which are driven by drive signals CS1 and CS2 fed thereto from a control unit 3 to place the control valve 32 at one of three positions. In the absence of the drive signals CS1 and CS1, both of the first and second solenoids 60a and 60b are disenergized to permit the control valve 32 to remains at its first, center position under the resilient forces of the first and second springs 61a and 61b provided in the control valve 32. In the first position, illustrated in FIG. 1, the control valve 32 provides communication between the ports P and R so that the whole amount of working fluid discharged from the hydraulic pump 30 is returned to the reservoir 34. In this position, the control valve 32 separates the ports A and B from the pressure source. The first solenoid 60a is energized by the drive signal CS1 fed thereto from the control unit 3 to move the control valve 32 to the second position against the resilient force of the first return spring 61a. In the second position, the control valve 32 provides communication between the ports P and B and also communication between the ports A and R so as to introduce fluid pressure through the ports P and B and release the fluid pressure through the ports A and R to the reservoir 34. The second solenoid 60b is energized by the drive signal CS2 fed thereto from the control unit 3 to move the control valve 32 to the third position against the resilient force of the second return spring 61b. In the third position, the control valve 32 provides communication between the ports p and A and also communication between the ports B and R so as to introduce fluid pressure through the ports P and A and release the fluid pressure through the ports B and R to the reservoir 34.

The cutoff valve 36 is normally held in a first, fail-safe position, illustrated in FIG. 1, under the resilient force of the return spring 62 provided in the cutoff valve 36 to separate the ports S1 and S2 from the ports N1 and N2. In the first position, the cutoff valve 36 provides communication between the ports S1 and S2, that is, communication between the cylinder chambers 26L and 26R. As a result, the piston 24 is held at its center under the resilient forces of the return springs 28L and 28R so that the steering shaft 20 and thus the rear road wheels 10RL and 10RR are held in the straight-ahead position. The cutoff valve 36 has a solenoid 62 which is driven by a drive signal CF fed thereto from the control unit 3 to move the cutoff valve 36 to a second position against the resilient force of the return spring 62 provided in the cutoff valve 36. In the second, rear road wheel steering control position, the cylinder chamber 26L is connected through the ports S1 and N1 to the port A of the control valve 32, whereas the cylinder chamber 26R is connected through the ports S2 and N2 to the port B of the control valve 32. The control unit 3 interrupts the drive signal CF to the cutoff valve 63 when a trouble occurs in the steering apparatus.

It is now assumed that the cutoff valve 63 is in the second, rear road wheel steering control position. In the absence of the drive signals CS1 and CS2 from the control unit 3, the control valve 32 is held in the first position, illustrated in FIG. 1, and it returns the whole amount of working fluid from the hydraulic pump 30 to the reservoir 34 through the ports P and R separated from the ports A and B. As a result, the fluid pressures are retained in the respective cylinder chambers 26L and 26R to hold the existing rear road wheel steer angle. This operation mode is referred to a holding mode. When the control unit 3 produces the drive signal CS1 to drive the solenoid 60a, the control valve 32 moves to the second position against the resilient force of the return spring 61a. In the second position, the fluid pressure is introduced from the hydraulic pump 30 through the ports P and B into the cylinder chamber 26R and the fluid pressure is discharged from the cylinder chamber 26L through the ports A and R to the reservoir 34. As a result, the piston 24 moves to the left, as view of FIG. 1, to turn the rear road wheels 10RL and 10RR to the right. This operation mode is referred to as a right-hand steering mode. When the control unit 3 produces the drive signal CS2 to drive the solenoid 60b, the control valve 32 moves to the third position against the resilient force of the return spring 61b. In the third position, the fluid pressure is introduced from the hydraulic pump 30 through the ports P and A into the cylinder chamber 26L and the fluid pressure is discharged from the cylinder chamber 26R through the ports B and R to the reservoir 34. As a result, the piston 24 moves to the right, as view of FIG. 1, to turn the rear road wheels 10RL and 10RR to the left. This operation mode is referred to as a left-hand steering mode.

The rear road wheel steer angle δR is repetitively determined from calculations performed by the control unit 3, these calculations being based upon various conditions of the automotive vehicle that are sensed during its operation. These sensed conditions include steering wheel angle θ, vehicle longitudinal speed V, actual rear road wheel steer angle δRR, vehicle lateral acceleration Yg, yaw rate $(d/dt)\phi$, vehicle slip angle Sa, etc. Thus, a steering wheel angle sensor 8, a vehicle speed sensor 6, a rear road wheel steer angle sensor 9, a lateral G sensor 11, a yaw rate sensor 12 and vehicle slip angle sensor 37 are connected to the control unit 3.

The steering wheel angle sensor 8 is provided to sense the degree θ of rotation of the steering wheel 15 with respect to its neutral position and it produces an electric signal indicative of the sensed steering angle θ. The steering angle indication signal has a sign indicating the direction in which the steering wheel 15 turns. In the illustrated case, the steering angle indication signal has a positive sign when the steering wheel 15 turns to the right with respect to its neutral position and a negative sign when the steering wheel 15 turns to the left with respect to its neutral position. The vehicle speed sensor 6 is provided to sense the vehicle longitudinal speed V and it produces an electric signal indicative of the sensed vehicle speed V. For example, the vehicle speed indication signal may have a positive sign when the vehicle moves forward and a negative sign when the vehicle moves rearward. The actual rear road wheel steer angle sensor 9 is located near the steering shaft 20 to sense the actual rear road wheel steer angle δRR corresponding to the position of the steering angle 20 with respect to its neutral position and it produces an electric signal indicative of the sensed rear road wheel steer angle δRR. For example, the rear road wheel steer angle indication signal has a positive sign when the rear road wheels 10RL and 10RR are turned to the right and a negative sign when the rear road wheels are turned to the left. The yaw rate sensor 12 may be taken in the form of a swing gyro provided to sense the rate $(d/dt)\phi$ of yawing motion of the vehicle and it produces an electric signal indicative of the sensed yaw rate $(d/dt)\phi$. For example the yaw rate indication signal has a positive sign when the yawing motion is directed to the right and a negative sign when the yawing motion is directed to the left. The vehicle slip angle sensor 37 is provided to sense the vehicle slip angle Sa and it produces an electric signal indicative of the sensed vehicle slip angle Sa. For example, the slip angle indication signal has a positive sign when the vehicle slips to the right and a negative sign when the vehicle slips to the left. The control unit 3 also receives a failure signal FS from a failure sensor 44 when the steering apparatus is subject to failure.

Figure 2:
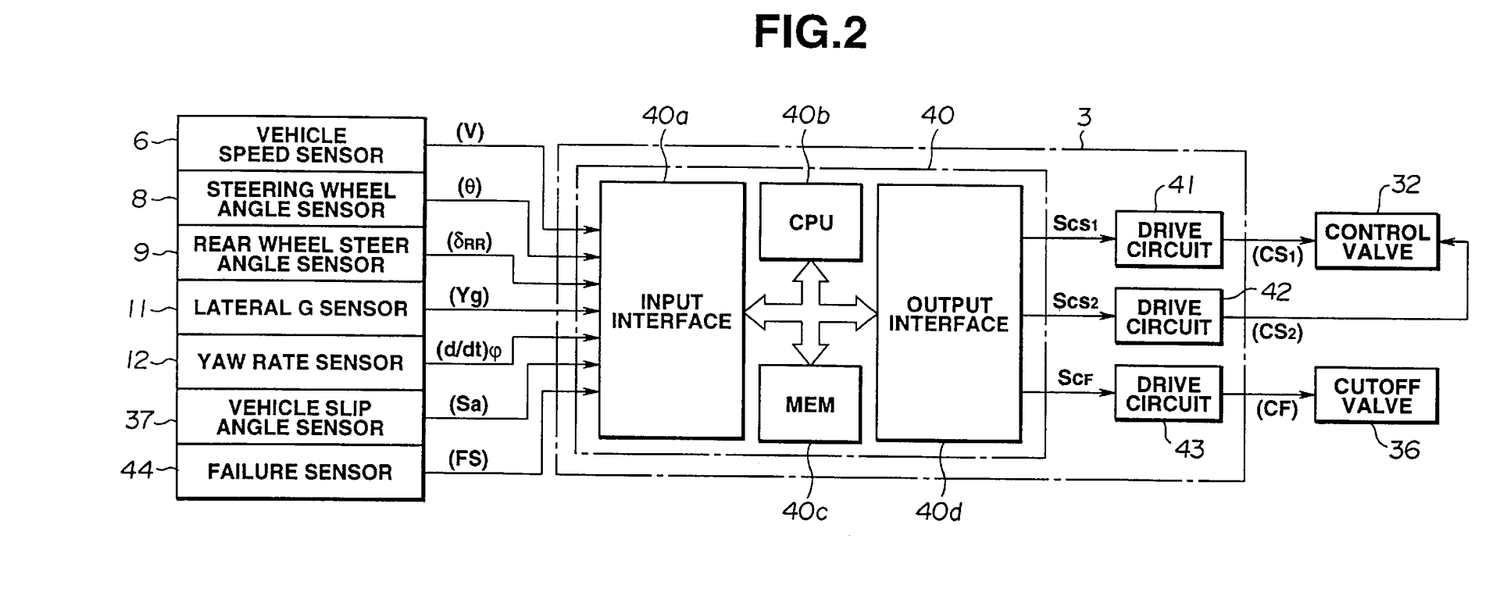
FIG. 2 is a block diagram showing the control unit used in the vehicle yawing behavior control apparatus of FIG. 1.

Referring to FIG. 2, the control unit 3 employs a digital computer 40 which includes an input interface unit 40a, a central processing unit (CPU) 40b, a memory (MEM) 40c and an output interface unit 40d. The central processing unit 40b communicate with the rest of the computer via data bus. The input interface unit 40a includes an analog-to-digital converter for converting the analog sensor signals applied thereto, one by one, into digital form for application to the central processing unit 40b. The memory 40c includes a random access memory (RAM) and a read only memory (ROM). The read only memory contains the programs for operating the central processing unit and further contains appropriate data used in calculating an appropriate value δR for rear road wheel steer angle. The output interface unit 40d includes a digital-to-analog converter for converting control words transferred thereto by the central processing unit 40b into digital form for application to drive circuits 41, 42 and 43. That is, the drive circuit 41 receives a control signal Scs1 and produces the drive signal CS1 to energize the solenoid 60a of the control valve 32. Similarly, the drive circuit 42 receives a control signal Scs2 and produces the drive signal CS2 to energize the solenoid 60b of the control valve 32. Likewise, the drive circuit 43 receives a control signal SCF and produces the drive signal CF to energize the solenoid 63 of the cutoff valve 36.

The principles of the calculations performed in the control unit 3 will be described. First of all, description will be made to a feedback control to bring the actual vehicle yawing motion into coincidence with a target value calculated based on various parameters sensed during vehicle operation. The reference yaw rate $(d/dt)\phi*o$ is given, according to a known equation of motion of the vehicle, as a function of vehicle speed V and steering wheel angle θ.

$$(d/dt)\phi*o = V/R$$

$$R = Ks \cdot L / \tan(\theta/N) \qquad (1)$$

where R is the radius of the circle along which the vehicle turns, L is the wheel base, N is the steering gear ratio and Ks is the stability factor. The stability factor Ks is a factor related to the stability of the vehicle turning behavior. The vehicle has a stronger understeer characteristic with a greater stability factor Ks. The reference yaw rate $(d/dt)\phi$ may be calculated with the use of steady yaw rate Ho. The steady yaw rate Ho is calculated as a function of vehicle speed V and steering wheel angle θ.

$$Ho = V/[L \cdot (1 + KsV^2)] \cdot (\theta/N) \qquad \ldots (2)$$

As well known in the art, the reference yaw rate $(d/dt)\phi*o$ may be calculated as:

$$(d/dt)\phi*o = Ho/(1+\tau s) \qquad \ldots (3)$$

where s is the Laplacian.

Figure 3:
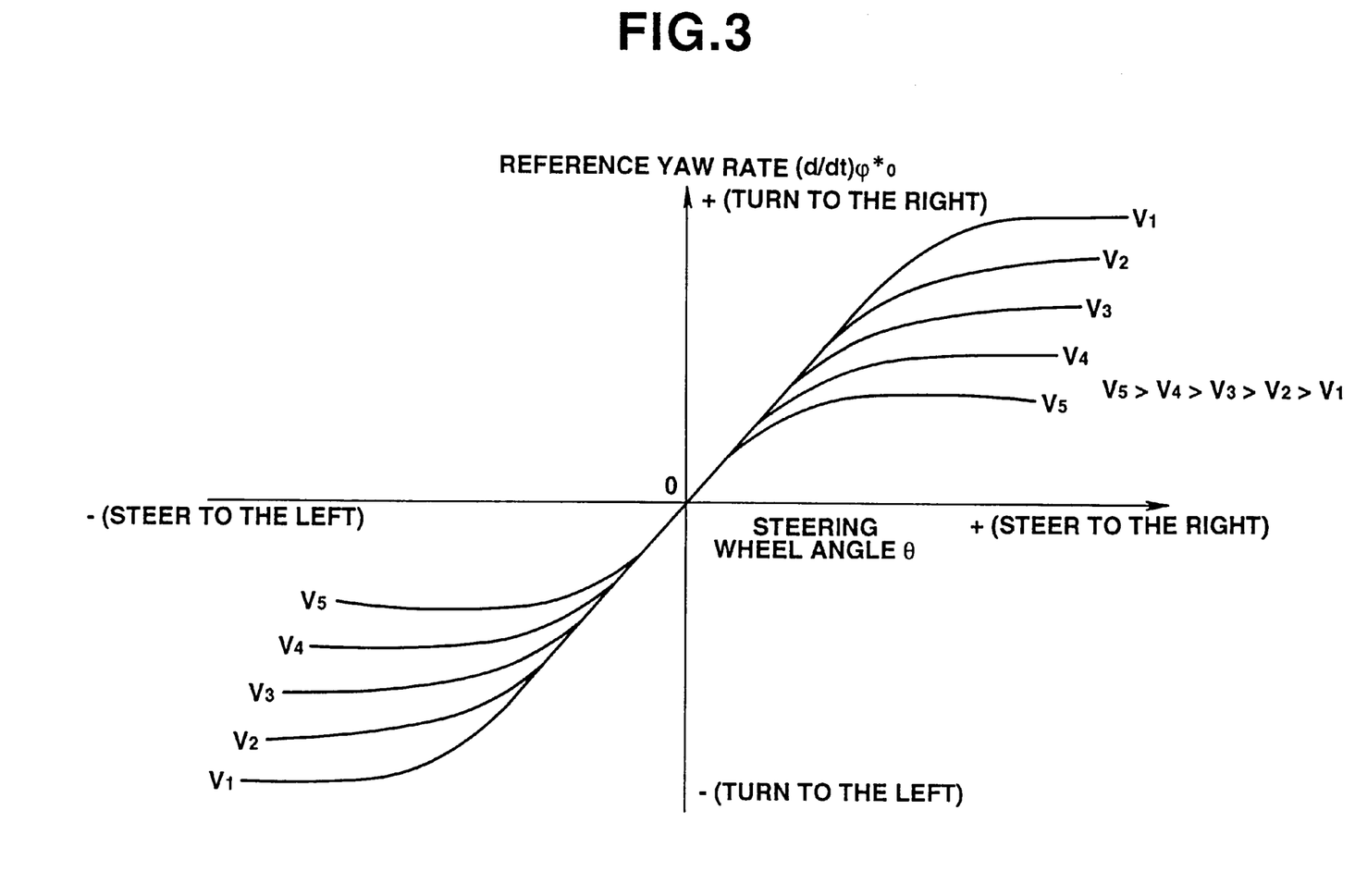
FIG. 3 is a graph of reference yaw rate versus steering wheel angle.

Although the reference yaw rate $(d/dt)\phi*o$ can be calculated from equation (1) or Equations (2) and (3), this calculation cannot be made without a heavy load. According to this invention, it is possible to reduce the load and time required for the calculation by a control map programmed into the digital computer in the form of a look-up table, as shown in FIG. 3, which defines the reference yaw rate $(d/dt)\phi*o$ as a function of steering wheel angle θ and vehicle speed V. In this case, the central processing unit may be programmed in a known manner to interpolate between the data at different entry points if desired. As shown in FIG. 3, the reference yaw rate $(d/dt)\phi*o$ has a positive sign when the steering wheel is turned to the right and a negative sign when the steering wheel is turned to the left.

If the reference yaw rate $(d/dt)\phi*o$ is used substantially as it stands as the target yaw rate, however, the control will be made without regard to the changes in the maximum values of the cornering power and force related to the friction coefficient of the road surface. As well known in the art, the tier characteristic of a pneumatic tired road wheel is such that as the lateral slip increases, the cornering force increases in a linear fashion and then decreases because of the wheel load. For the same tire, however, the tire characteristic related to the cornering force is changed as the friction coefficient of the road surface on which the vehicle is moving changes. In more detail, an iced or wet road surface provides such a very small friction coefficient that the tire loses the gripping force quickly as the wheel lateral angle increases. Thus, the maximum value of the cornering force given with respect to the lateral slip angle is small and its inclination, that is, the cornering force per unit lateral slip angle and the cornering power are small. A concrete or dry road surface provides such a great friction coefficient that the tire retains the gripping force. Thus, the maximum value of the cornering force given with respect to the lateral slip angle is great and its inclination and the cornering power are great.

Assuming now that the vehicle is moving with the lateral acceleration Yg and the yaw rate $(d/dt)\phi*$ being balanced, the following equations are established:

$$(d/dt)\phi* = V/R$$

$$Yg=V^2/R=(d/dt)\phi*V$$

where R is the radius of turning movement of the vehicle and V is the vehicle speed. With regard to the transient phase, rotation of the steering wheel results in a front road wheel cornering force, a yawing motion, a vehicle lateral angle, a rear road wheel cornering force and a lateral acceleration in this sequence. When the friction coefficient of the road surface changes to change the cornering force, any change occurs in the lateral acceleration. In more detail, when the cornering power is small because of a small friction coefficient of the road surface, the cornering force increases in a slow response to rotation of the steering wheel and the vehicle lateral acceleration is small. Since the maximum value of the cornering force is small, the maximum vehicle lateral acceleration is small. When the cornering power is great because of a great friction coefficient of the road surface, the cornering force increases in a fast response to rotation of the steering wheel and the vehicle lateral acceleration is great. Since the maximum value of the cornering force is great, the tire can retain a good gripping force when the vehicle turns in a circle having a small radius and the vehicle lateral acceleration is great.

In view of the above considerations, the possible maximum yaw rate value $(d/dt)\phi*\text{MAX}$ is calculated based on the lateral acceleration Yg and the vehicle speed V from Equation (4).

$$(d/dt)\phi*\text{MAX}=kYg/V \qquad \ldots (4)$$

where k is the visual coefficient. Description will be made to the visual coefficient k, as can be seen from the time relationship between the yaw rate and the lateral acceleration, the lateral acceleration is delayed with respect to the yawing motion. For this reason, it is required to correct the maximum yaw rate $(d/dt)\phi*\text{MAX}$ calculated from Equation (4) to compensate for the time delay by multiplying a proportional constant greater than "1" as well as a predetermined unit conversion coefficient. Thus, the proportional coefficient k is set to satisfy this condition. The proportional coefficient k is set such a value that the maximum value $|(d/dt)\phi*o|$ of the reference yaw rate remains less than the absolute value $|(d/dt)\phi*\text{MAX}|$ of the maximum yaw rate under conditions ensuring a good gripping force (on a good road surface having a high $\mu$). Control hunting would occur if the target yaw rate $(d/dt)\phi*$ is set at the reference yaw rate $(d/dt)\phi*o$ when the reference yaw rate $(d/dt)\phi*o$ exceeds the maximum yaw rate $(d/dt)\phi*\text{MAX}$. It is possible to avoid this problem by setting the target yaw rate $(d/dt)\phi*1$ at a maximum yaw rate $(d/dt)\phi*\text{MAX}$ when the absolute value $|(d/dt)\phi*o|$ of the reference yaw rate $(d/dt)\phi*o$ exceeds the absolute value $|(d/dt)\phi*\text{MAX}|$ of the maximum yaw rate $(d/dt)\phi*\text{MAX}$.

If the steer angle of the rear road wheels is controlled merely in such a manner that the actual yaw rate $(d/dt)\phi$ follows the target yaw rate $(d/dt)\phi*1$ set as described above, the actual yaw rate $(d/dt)\phi$ will become zero upon occurrence of lateral acceleration during vehicle turning movement. Such a control will act in a direction to promote unstable vehicle yawing behavior. According to the invention, an unstable vehicle yawing behavior is detected when the vehicle slip angle is directed outside with respect to the vehicle turning movement and is greater than the reference slip angle. In this case, the target yaw rate $(d/dt)\phi*1$ is corrected outside with respect to the vehicle turning movement. This correction is made to a greater degree at a greater deviation of the vehicle slip angle from the reference slip angle. A feedback control is performed to bring the deviation between the actual yaw rate $(d/dt)\phi$ and the corrected target yaw rate $(d/dt)\phi*$ to zero. For this purpose, the yaw rate deviation $\epsilon$ is calculated from Equation (5).

$$\epsilon=(d/dt)\phi-(d/dt)\phi* \qquad \ldots (5)$$

Figure 4:
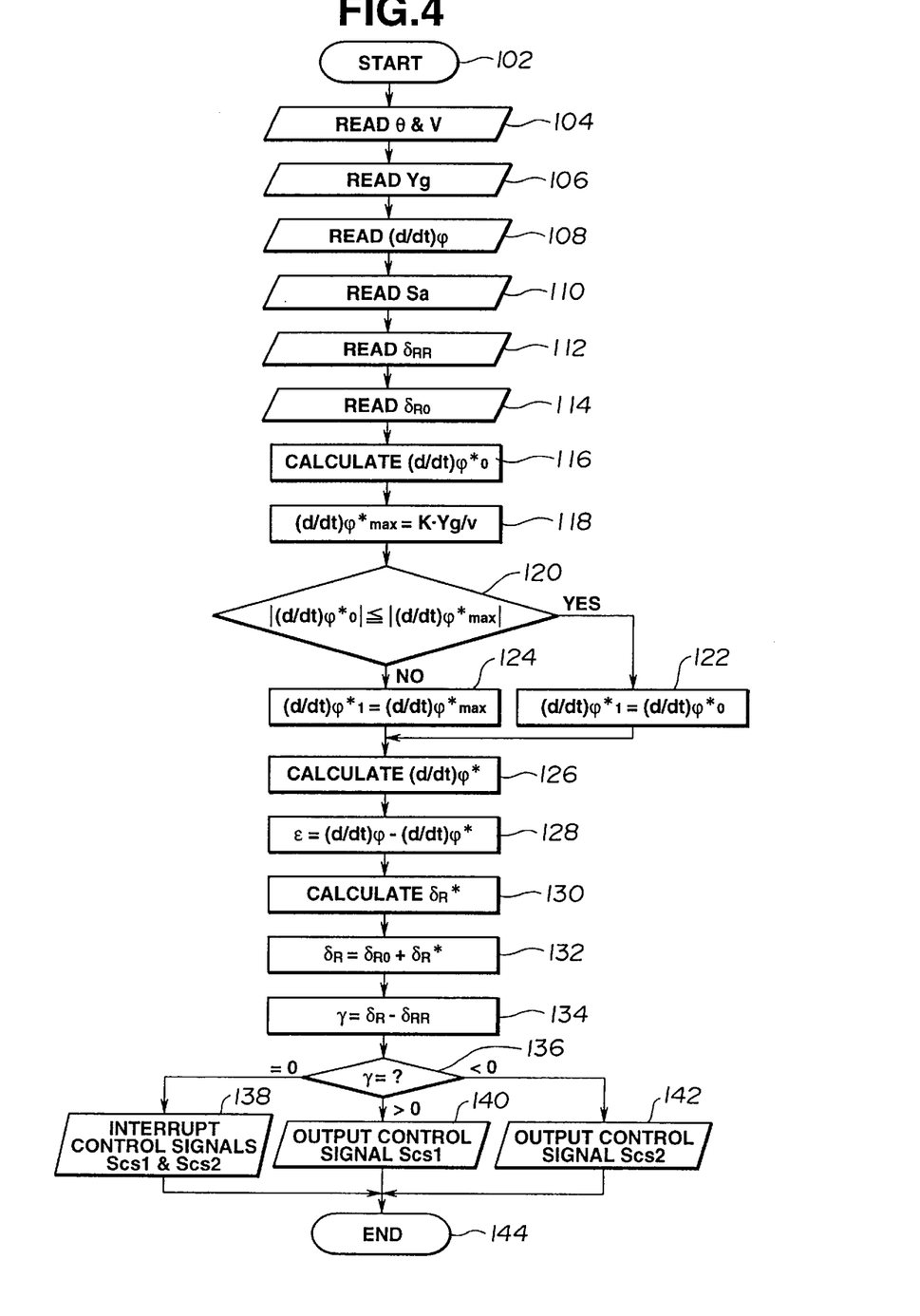
FIG. 4 is a flow diagram showing the programming of the digital computer as it is used to produce the control signals used for vehicle yawing behavior control.

FIG. 4 is a flow diagram illustrating the programming of the digital computer as it is used to produce the control signal Scs1 and Scs2. The computer program is entered at the point 102 at uniform intervals of time $\Delta T$, for example, 20 msec. Various sensor signals are read, one by one, into the computer memory 40c via the data bus. Thus, at the point 104 in the program, the steering wheel angle $\theta$ sensed by the steering wheel angle sensor 8 and the vehicle speed V sensed by the vehicle speed sensor 6 are read into the computer memory. At the point 106, the lateral acceleration Yg sensed by the lateral acceleration sensor 11 is read into the computer memory. At the point 108, the actual yaw rate $(d/dt)\phi$ sensed by the yaw rate sensor 12 is read into the computer memory. At the point 110, the vehicle slip angle Sa sensed by the vehicle slip angle sensor 37 is read into the computer memory. At the point 112, the actual rear road wheel steer angle $\delta_{RR}$ sensed by the rear road wheel steer angle sensor 9 is read into the computer memory. At the point 114, the last control factor $\delta_{RO}$ for use in controlling the rear road wheel steering angle, which was calculated during the last cycle of execution of another program and stored in the computer memory, is read.

At the point 116 in the program, reference yaw rate $(d/dt)\phi*o$ is calculated by the central processing unit 40b. This calculation is made with the use of the control map which specifies the reference yaw rate $(d/dt)\phi*o$ as a function of vehicle speed V and steering wheel angle $\theta$, as shown in FIG. 3. At the point 118, The maximum yaw rate $(d/dt)\phi*\text{MAX}$ is calculated as a function of lateral acceleration Yg and vehicle speed V from Equation (4). At the point 120, a determination is made as to whether or not the absolute value $|(d/dt)\phi*o|$ of the yaw rate $(d/dt)\phi*o$ is equal to or less than the absolute value $|(d/dt)\phi*\text{MAX}|$ of the maximum yaw rate $(d/dt)\phi*\text{MAX}$ calculated at the point 118. If the answer to this question is "YES", then the program proceeds to the point 122 where the target yaw rate $(d/dt)\phi*1$ is set at the reference yaw rate $(d/dt)\phi*o$ and then to the point 126. Otherwise, the program proceeds to the point 124 where the target yaw rate $(d/dt)\phi*1$ is set at the maximum yaw rate $(d/dt)\phi*\text{MAX}$ and then to the point 126.

Figure 5:
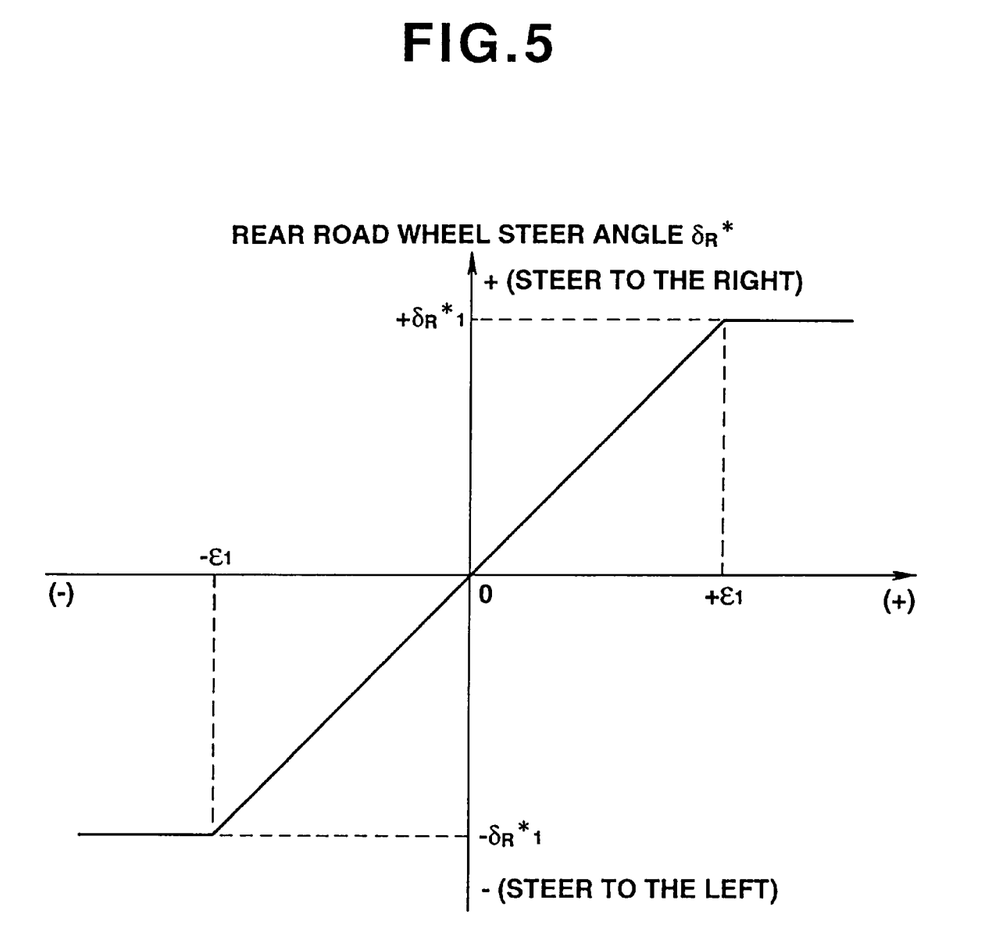
FIG. 5 is a graph of rear road wheel steer angle versus yaw rate deviation.

At the point 126 in the program, the target yaw rate $(d/dt)\phi*1$ is corrected based on the vehicle slip angle Sa. The corrected target yaw rate $(d/dt)\phi*$ is stored in the computer memory 40c. The details of this correction will be described in connection with FIG. 6. At the point 128, a deviation $\epsilon$ of the corrected target yaw rate $(d/dt)\phi*$ calculated at the point 126 from the actual yaw rate $(d/dt)\phi$ read at the point 108 is calculated from Equation (5). At the point 130, the yaw rate deviation $\epsilon$ is used to calculate a rear road wheel steer angle $\delta_R*$. This calculation is made from a control map programmed into the digital computer. The control map defines the rear road wheel steer angle $\delta_R*$ as a function of the yaw rate deviation $\epsilon$, as shown in FIG. 5. At the point 132, a target rear road wheel steer angle $\delta_R$ is calculated, from equation (6), based on the rear road wheel steer angle $\delta_R*$ calculated at the point 130 and the actual rear road wheel steer angle control factor $\delta_{RO}$ read at the point 114. At the point 134, a rear road wheel steer angle deviation $\gamma$ is calculated, from Equation (7), based on the rear road wheel steer angle $\delta_R$ calculated at the point 132 and the actual rear road wheel steer angle $\delta_{RR}$ read at the point 112.

At the point 136 in the program, a determination is made as to the rear road wheel steer angle deviation $\gamma$. If the rear road wheel steer angle deviation γ is equal to zero, then it means that the actual steer angle δRR of the rear road wheel 10RL and 10RR is equal to the rear road wheel steer angle δR calculated at the point 132 and the program proceeds to the point 138 where a command is produced to interrupt the control signals Scs1 and Scs2. Following this, the program proceeds to the end point 144. If the rear road wheel steer angle deviation γ is positive, then it means that the rear wheels 10RL and 10RR are required to be turned to the right with respect to the rear road wheel steer angle δR calculated at the point 132 and the program proceeds to the point 140 where a command is produced to output the control signal Scs1. Following this, the program proceeds to the end point 144. If the rear road wheel steer angle deviation γ is negative, then it means that eh rear wheels 10RL and 10RR are required to be turned to the left with respect to the rear road wheel steer angle δR calculated at the point 132 and the program proceeds to the point 142 where a command is produced to output the control signal Scs2. Following this, the program proceeds to the end point 144.

Figure 6:
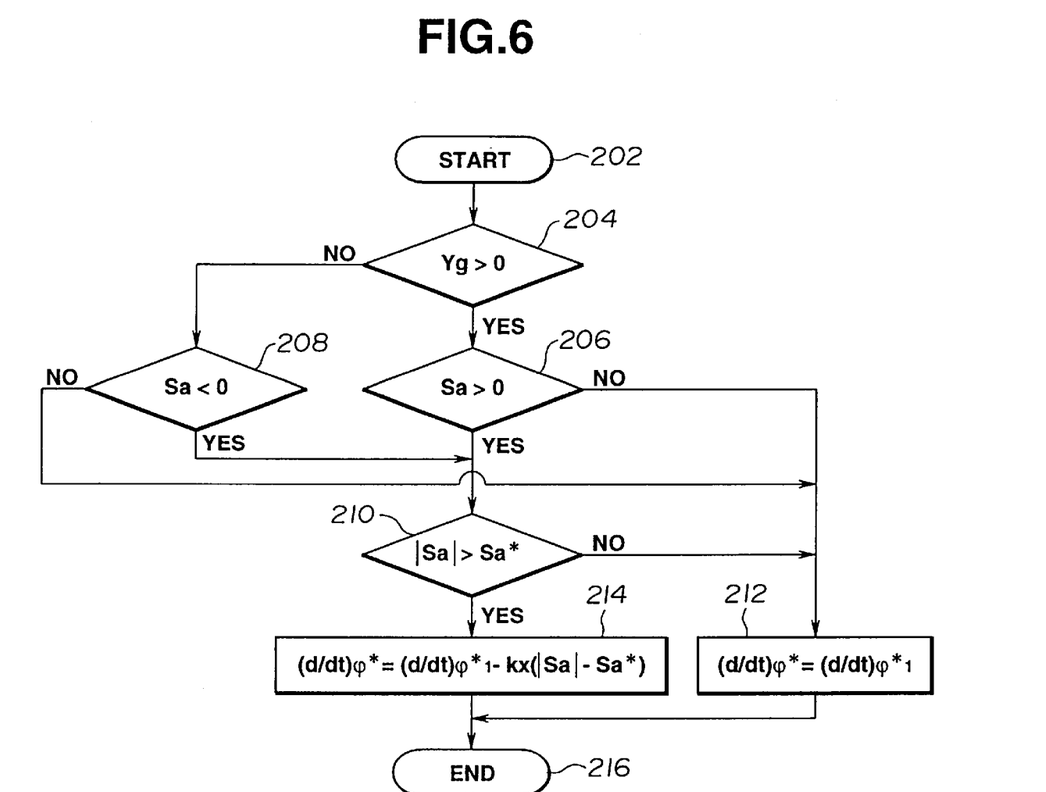
FIG. 6 is a detailed flow diagram illustrating the programming of the digital computer as it is used to correct the target yaw rate.

FIG. 6 is a flow diagram illustrating the above calculation of the corrected target yaw rate $(d/dt)\phi^*$. At the point 202 in FIG. 6, which corresponds to the point 126 of FIG. 4, the computer program is entered. At the point 204, a determination is made as to whether or not the lateral acceleration Yg read at the point 106 of FIG. 4 is positive. If the answer to this question is "YES", then it means that the vehicle is turning toward the left and the program proceeds another determination step at the point 206. This determination is as to whether or not the vehicle slip angle Sa is positive. If the answer to this question is "YES", then it means that the vehicle slip angle Sa is directed toward the right, that is, the vehicle slip angle Sa is directed outside with respect to the vehicle turning movement, and the program proceeds to the point 210. Otherwise, it means that the vehicle slip angle Sa is directed toward the left and the program proceeds to the point 212 where the corrected target yaw rate $(d/dt)\phi^*$ is set at the target yaw rate $(d/dt)\phi^*1$. Following this, the program proceeds to the end point 216 which corresponds to the point 128 of FIG. 4.

If the answer to the question inputted at the point 204 is "NO", then it means that the vehicle is turning toward the right and the program proceeds to another determination step at the point 208. This determination is as to whether or not the vehicle slip angle Sa is negative. If the answer to this question is "YES", then it means the vehicle slip angle Sa is directed toward the left, that is, the vehicle slip angle Sa is directed outside with respect to the vehicle turning movement and the program proceeds to the point 210. Otherwise, it means that the vehicle slip angle Sa is directed to the right and the program proceeds to the point 212.

At the point 210 in the program, a determination is made as to whether or not the absolute value |Sa| of the vehicle slip angle Sa is greater than a reference slip angle Sa*. The reference slip angle Sa* is predetermined as an upper limit of the vehicle slip angle range where any unstable vehicle behavior cannot be caused by the vehicle yawing behavior control made with the target yaw rate $(d/dt)\phi^*1$. Thus, the target yaw rate $(d/dt)\phi^*1$ is not required to be corrected in spite of the fact that the vehicle slip angle Sa is directed to the left as long ass the absolute value of the vehicle slip angle Sa is less than the reference slip angle Sa*. If the answer to this question is "NO", then the program proceeds to the point 212. Otherwise, the program proceeds to the point 214 where the corrected target yaw rate $(d/dt)\phi^*$ is calculated from the following equation:

$$(d/dt)\phi^*=(d/dt)\phi^*1-Ki(|Sa|-Sa^*) \quad \ldots \text{(b 8)}$$

Upon completion of this calculation, the program proceeds to the end point 216.

The operation of the vehicle yawing behavior control apparatus of the invention will be described. It is now assumed that the piston 24 of the rear road wheel steering cylinder 22 is placed at the center position thereof by the return springs 28L and 28R placed in the respective cylinder chambers 26L and 26R. First of all, description is made as an assumption that the corrected yaw rate $(d/dt)\phi^*$ is equal to the target yaw rate $(d/dt)\phi^*$. When the vehicle is moving in a straight line on a flat and good road surface with the cutoff valve 36 being driven in the presence of the drive signal CF, the actual yaw rate $(d/dt)\phi$ sensed by the yaw rate sensor 12 and read at the point 108 of FIG. 4 is zero or almost zero. Since the steering wheel angle θ sensed by the steering wheel angle sensor 8 is zero or almost zero regardless of the vehicle speed V sensed by the vehicle speed sensor 6, the reference yaw rate $(d/dt)\phi^*o$ calculated at the point 116 of FIG. 4 is zero or almost zero. Similarly, since the lateral acceleration Yg sensed by the lateral acceleration sensor 11 is zero or almost zero regardless of the vehicle speed V sensed by the vehicle speed sensor 6, the maximum yaw rate $(d/dt)\phi^*MAX$ calculated at the point 118 of FIG. 4 is zero or almost zero. Thus, the target yaw rate $(d/dt)\phi^*1$ is set at one of the reference and maximum yaw rates $(d/dt)\phi^*o$ and $(d/dt)\phi^*MAX$ having a smaller absolute value. In either case, the target yaw rate $(d/dt)\phi^*1$ is set at zero or almost zero. Since the actual way rate $(d/dt)\phi$ is zero or almost zero, the yaw rate deviation ε calculated at the point 128 of FIG. 4 is zero or almost zero, and the rear road wheel steer angle δR* calculated at the point 130 of FIG. 4 is zero or almost zero. Since the steering wheel angle θ is zero or almost zero, the rear road wheel steer angle control factor δRO is zero or almost zero and thus the rear road wheel steer angle δR calculated at the point 132 of FIG. 4 is zero or almost zero. Furthermore, the piston 24 of the rear road wheel steering cylinder 22 is at its center position so that the rear road wheels 10RL and 10RR are their straight-ahead positions. In this case, the actual rear wheel steer angle δRR read at the point 112 of FIG. 4 is zero or almost zero and the rear road wheel steer angle deviation γ is zero or almost zero. Since the control is transferred from the point 136 to the point 138 so that neither of the control signals Scs1 nor Scs2 is produced, therefore, both of the solenoids 60a and 60b of the control valves 32 remain disenergized to retain the control valve 32 at its first position to return the whole amount of working fluid introduced from the hydraulic pump 30 to the reservoir 34. As a result, the piston 24 of the rear road wheel steering cylinder 22 remains at its center so that the vehicle moves with the rear-left and -right road wheels 10RL and 10RR held at their straight-ahead positions.

Description will be made to the case where the vehicle is turning toward the right in a circle of a great radius for the vehicle speed. It is now assumed that the rear road wheel steer angle control factor δRO increases linearly in the positive direction in direct proportion to the angle through which the steering wheel is turned to the right with respect to its straight-ahead position and in the negative direction in direct proportion to the angle through which the steering angle is turned to the left with respect to its straight-ahead position. The cornering power and force are great when the vehicle is moving on such a good road surface. Since the radium of the circle in which the vehicle turns is great, the steering wheel angle θ read at the point 104 of FIG. 4 increases at a gentle rate at uniform intervals (sampling intervals) of execution of the program of FIG. 4. In this case, the maximum value of the steering wheel angle θ is small.

For this reason, the reference yaw rate $(d/dt)\phi*o$ calculated at the point 116 of FIG. 4 increases in the positive direction at a gentle rate at uniform intervals of execution of the program of FIG. 4. Since the maximum value of the steering wheel angle θ is small, the reference yaw rate $(d/dt)\phi*o$ reaches a small positive value upon the completion of the steering wheel turning operation.

Since the vehicle is moving on a good road surface, the cornering force of each of the road wheels increases at a gentle rate as the steering wheel angle increases toward the right. In this case, the lateral acceleration Yg read at the point 106 of FIG. 4 increases in the positive direction at a gentle rate at the intervals of execution of the program of FIG. 4 as the cornering force increases. Since the vehicle is moving at a constant speed, the lateral acceleration Yg read upon completion of the steering wheel turning operation is a small positive value. Because of this, the maximum yaw rate $(d/dt)\phi*$MAX is a positive small value.

The proportional constant k used in calculating the maximum yaw rate $(d/dt)\phi*$MAX from Equation (4) is set at such a value that the absolute value $|(d/dt)\phi*o|$ of the reference yaw rate $(d/dt)\phi*o$ does not exceed the absolute value $|(d/dt)\phi*$MAX$|$ of the maximum yaw rate $(d/dt)\phi*$MAX under conditions the vehicle is moving on a good road surface and the tire has a sufficient gripping force. In this case, therefore, the control is transferred from the point 120 of FIG. 4 to the point 122 of FIG. 4 where the target yaw rate $(d/dt)\phi*1$ is set at the reference yaw rate $(d/dt)\phi*o$. Since the reference yaw rate $(d/dt)\phi*o$ set as the target reference yaw rate $(d/dt)\phi*1$ increases at a gentle rate, the yaw rate deviation ε calculated at the point 128 of FIG. 4 at uniform time intervals (sampling intervals) of execution of the program of FIG. 4 for feedback control to bring the actual yaw rate $(d/dt)\phi$ into coincidence with the target yaw rate $(d/dt)\phi*1=(d/dt)\phi*$ is a small negative value, and the rear road wheel steer angle δR* calculated at the point 130 of FIG. 4 in correspondence to the small negative yaw rate deviation ε is also small negative value. In this case, the yaw rate deviation ε is much smaller than a predetermined negative value −ε1. For this reason, the rear road wheel steer angle δR* cannot be retained at the negative upper limit −δR*1.

As can be seen from Equation (6), the rear road wheel steer angle δR calculated at the point 132 of FIG. 4 at uniform time intervals (sampling intervals) of execution of the program is the sum of the small negative rear road wheel steer angle δR* to the rear road wheel steer angle control factor δRO. At the following point 134 of FIG. 4, the rear road wheel steer angle deviation γ is calculated based on the actual rear road wheel steer angle δRR read at the point 110 of FIG. 4 from Equation (7). For example, because of a small steering input at the start of the steering wheel turning operation, the rear road wheel steer angle control factor δRO may have a small positive value. In this case, the rear road wheel steer angle δR, which is the sum of the small positive rear road wheel steer angle control factor δRO and the small negative rear road wheel steer angle δR*, may have a negative value in a moment. On the other hand, the rear road wheel steer angle deviation γ has a negative value in a moment since the actual rear road wheel steer angle δRR is almost zero just before the steering wheel is turned toward the right. Thus, the control is transferred from the point 136 of FIG. 4 to the point 142 of FIG. 4 where the control signal Scs2 is outputted to the drive circuit 42 which thereby produces a drive signal CS2 to energize the solenoid 60*b*, causing the control valve 32 to shift to the third position where the fluid pressure is introduced from the hydraulic pump 30 into the left cylinder chamber 26L of the rear road wheel steering cylinder 22. This causes the piston 24 to move toward the right, as viewed in FIG. 1, and the steering shaft 20 to move toward the right, as viewed in FIG. 1. As a result, the rear road wheels 10RL and 10RR turn toward the left in a moment and the relative steering angle between the front and rear road wheels increases in a moment to prompt the yaw moment of the vehicle while accelerating the yaw rate. This is effective to provide good vehicle heading performance.

Since the yaw rate deviation ε calculated at the step 128 of FIG. 4 remains at small negative values and the rear road wheel steer angle control factor δRO increases in the positive direction in a linear fashion as the steering wheel angle increases when the vehicle turns at a constant speed in a circle having a great radius, however, the rear road wheel steer angle δR calculated at the point 132 of FIG. 4 will change to a positive value. When the actual rear road wheel steer angle δRR is still at zero or a small negative value, the rear road wheel steer angle deviation γ calculated at the point 134 of FIG. 4 changes to zero and then to a positive value. During the execution of the program of FIG. 4, thus, the control is transferred from the point 136 of FIG. 4 to the point 138 of FIG. 4 to interrupt the control signal Scs2 and then the control is transferred from the point 136 of FIG. 4 to the point 140 of FIG. 4 to output the control signal Scs1 to the drive circuit 41 which thereby produces the drive signal CS1 to energize the solenoid 60*a* of the control valve 32 so as to move the control valve 32 to its second position. In this position, the fluid pressure is introduced from the hydraulic pump 30 through the ports P and B into the right cylinder chamber 26R of the rear road wheel steering cylinder 22 to move the piston 24 to the left, as viewed in FIG. 1. This causes the steering shaft 20 to move to the left, as viewed in FIG. 1, so as to turn the rear road wheels 10RL and 10RR in phase with respect to the front road wheels 10FL and 10FR. This is effective to suppress the vehicle yaw moment so as to improve the vehicle driving stability. It is to be understood, of course, that a good vehicle yaw rate occurs to improve the transient cornering characteristic since the feedback control continues to bring the actual yaw rate $(d/dt)\phi$ into coincidence with the reference yaw rate $(d/dt)\phi*o$ set at the target yaw rate $(d/dt)\phi*1=(d/dt)\phi*$.

When the vehicle turns toward the left at a constant speed in a circle having a great radius on a good road surface after its constant-speed straight-line movement, the signs of all of the sensor signals, except for the vehicle speed indication signal, are inverted. As a result, the sign of the rear road wheel steer angle control factor δRO is inverted and the signs of the reference and maximum yaw rates $(d/dt)\phi*o$ and $(d/dt)\phi*$MAX are inverted. For this reason, the signs of the target yaw rate $(d/dt)\phi*1=(d/dt)\phi*$, the yaw rate deviation ε, the rear road wheel steer angle δR*, the rear road wheel steer angle δR and the rear road wheel steer angle deviation γ are inverted. During the execution of the program of FIG. 4, thus, the control is transferred from the point 136 of FIG. 4 to the point 138 of FIG. 4 to interrupt the control signal Scs1 and then the control is transferred from the point 136 of FIG. 4 to the point 142 of FIG. 4 to output the control signal Scs2 to the drive circuit 42 which thereby produces the drive signal CS2 to energize the solenoid 60*b* of the control valve 32 so as to move the control valve 32 to its third position. In this position, the fluid pressure is introduced from the hydraulic pump 30 through the ports P and A into the left cylinder chamber 26L of the rear road wheel steering cylinder 22 to move the piston 24 to the right, as viewed in FIG. 1. This causes the steering shaft 20 to move to the right, as viewed in FIG. 1, so as to turn the rear road wheels 10RL and 10RR toward the right in phase with respect to the front road wheels 10FL and 10FR. This is effective to suppress the vehicle yaw moment so as to improve the vehicle driving stability. It is to be understood, of course, that a good vehicle yaw rate occurs to improve the transient cornering characteristic since the feedback control continues to bring the actual yaw rate $(d/dt)\phi$ into coincidence with the reference yaw rate $(d/dt)\phi^*o$ set at the target yaw rate $(d/dt)\phi^*1=(d/dt)\phi^*$.

When the vehicle turns toward the right at a constant speed in a circle having a small radius on a good road surface after its constant-speed turning movement in a circle having a great radius, the steering wheel angle $\theta$ read at the point 104 of FIG. 4 increases in the positive direction and thus the reference yaw rate $(d/dt)\phi^*o$ calculated at the point 116 of FIG. 4 increases in the positive direction. As the lateral acceleration Yg read at the point 106 of FIG. 4 increases in the positive direction, the maximum yaw rate $(d/dt)\phi^*$MAX calculated at the point 118 of FIG. 4 increases at the positive direction. Since the vehicle is moving on a good road surface and the good gripping force is still retained, however, the absolute value $|(d/dt)\phi^*o|$ of the reference yaw rate $(d/dt)\phi^*o$ is still less than the absolute value $|(d/dt)\phi^*$MAX$|$ of the maximum yaw rate $(d/dt)\phi^*$MAX and the control is transferred from the point 120 of FIG. 4 to the point through the point 122 of FIG. 4 where the target yaw rate $(d/dt)\phi^*1$ is set at a reference yaw rate $(d/dt)\phi^*o$. Since the actual yaw rate $(d/dt)\phi$ is retarded with respect to the target yaw rate $(d/dt)\phi^*1=(d/dt)\phi^*$, the yaw rate deviation $\epsilon$ calculated at the point 128 of FIG. 4 has a great negative value as compared to the case where the vehicle is turning toward the right at a constant speed in a circle having a great radius. At the point 130 of FIG. 4, thus, a great negative rear road wheel steer angle $\delta R^*$ is calculated in correspondence with the yaw rate deviation $\epsilon$. On the other hand, at the point 132 of FIG. 4, the central processing unit calculates the rear road wheel steer angle $\delta R$ by adding the great negative rear road wheel steer angle $\delta R^*$ to the great positive rear road wheel steer angle control factor $\delta R o$ which increases as the steering wheel angle increases. Assuming now that the rear road wheel steering angle control factor $\delta R o$ is used for controlling the rear road wheels 10RL and 10RR in phase with the front wheels 10FL and 10FR during vehicle turning operation, the relative steering angle between the front and rear road wheels to be achieved by the rear road wheel steer angle $\delta R$ is to have a great value. Therefore, the moment the steering wheel is turned further toward the right from the position where the vehicle turns at a constant speed in a circle having a great radius to turn in a circle having a small radius, the rear road wheel steer angle deviation $\gamma$ calculated at the point 134 of FIG. 4 becomes negative like the initial stage of a transfer from the vehicle straight line movement to the vehicle turning movement. For this reason, the control is transferred from the point 136 of FIG. 4 to the point 142 of FIG. 4 where the control signal Scs2 is outputted to the drive circuit 42 which thereby produces the drive signal CS2 to engage the solenoid 60$b$ of the control valve 32. As a result, the rear road wheels 10RL and 10RR which have been steered toward the right are steered toward the left in a moment to increase the relative steer angle between the front and rear road wheels so as to prompt the vehicle yaw moment and accelerate the yaw rate. This is effective to provide good vehicle heading performance. Since the rear road wheel steer angle control factor $\delta R o$ increases in the positive direction as the steering wheel angle increase, however, the rear road wheel steer angle deviation $\gamma$ calculated at the point 134 of FIG. 4 increases to zero and then to a positive value. During the execution of the program of FIG. 4, thus, the control is transferred from the point 136 of FIG. 4 to the point 138 of FIG. 4 to interrupt the control signal Scs2 and then the control is transferred from the point 136 of FIG. 4 to the point 140 of FIG. 4 to output the control signal Scs1 to the drive circuit 41 which thereby produces the drive signal CS1 to energize the solenoid 60$a$ of the control valve 32 so as to move the control valve 32 to its second position. In this position, the fluid pressure is introduced from the hydraulic pump 30 through the ports P and B into the right cylinder chamber 26R of the rear road wheel steering cylinder 22 to move the piston 24 to the left, as viewed in FIG. 1. This causes the steering shaft 20 to move to the left, as viewed in FIG. 1, so as to turn the rear road wheels 10RL and 10RR toward the right in phase with respect to the front road wheels 10FL and 10FR. This is effective to suppress the vehicle yaw moment so as to improve the vehicle driving stability. It is to be understood, of course, that a good vehicle yaw rate occurs to improve the transient cornering characteristic since the feedback control continues to bring the actual yaw rate $(d/dt)\phi$ into coincidence with the reference yaw rate $(d/dt)\phi^*o$ set at the target yaw rate $(d/dt)\phi^*1=(d/dt)\phi^*$.

Although it may be considered that the rear road wheel steer angle $\delta R^*$ is retained at the predetermined negative value $-\delta R^*1$ at the point 130 of FIG. 4 because of the yaw rate deviation $\epsilon$ calculated as a great negative value at the point 128 of FIG. 4, the stable vehicle behavior can be retained even though the rear road wheel steer angle $\delta R^*$ is retained at the predetermined negative value $-\delta R^*1$ since the predetermined negative value $-\delta R^*1$ is set as the lower limit of the rear road wheel steer angle $\delta R^*$.

When the vehicle turns at a constant speed in a circle having a great radius on a good road surface after the vehicle turning movement in a circle having a small radius, the rear road wheel steering control is made in the direction opposite to that where the rear road wheel steering control is made when the vehicle turns t a constant speed in a circle having a small radius on a good road surface after the vehicle turning movement in a circle having a great radius. In this case, the relative steering angle between the front and rear road wheels decreases in a moment to suppress the yaw moment. As a result, the understeer characteristic is intensified and the relative steer angle between the front and rear road wheels comes to a value corresponding to the steering wheel angle $\theta$ required for the radius of the circle in which the vehicle turns. This is effective to improve the vehicle driving stability. It is to be understood, of course, that a good vehicle yaw rate occurs to improve the transient cornering characteristic since the feedback control continues to bring the actual yaw rate $(d/dt)\phi$ into coincidence with the reference yaw rate $(d/dt)\phi^*o$ set at the target yaw rate $(d/dt)\phi^*1=(d/dt)\phi^*$.

When the vehicle turns toward the left on a good road surface in circles having different radii, the sensed and calculated values are opposite to those sensed and calculated when the vehicle turns toward the right in circles having different radii. The rear wheel steering control performed in this case is substantially the same except that the operations commanded for the left and right rear road wheels 10RL and 10RR are inverted.

When the vehicle turns on a good road surface with the steering wheel being turned to a great extent toward the left and right, the vehicle turns in one direction in a circle having a great radius, in a circle having a small radius and in a circle having a great radius, and then in the opposite direction in a circle having a small radius and in a circle having a great radius. While this cycle of the vehicle turning operations is repeated, substantially the same controls as described above are performed to permit quick and stable vehicle turning operation. Substantially the same control is performed according to the vehicle speed V when the vehicle moving on a good road surface having a high $\mu$ is accelerated or decelerated regardless of whether the vehicle is moving in a straight-line or circle.

Description will be made to the case where the vehicle turns toward the right at a constant speed on an iced or snow-covered road surface. When the vehicle moves on such a road surface having a low friction factor, the cornering power is small and the maximum value of the cornering force is small regardless of the radius of the circle in which the vehicle turns. Thus, the cornering force cannot follow the steering wheel angle increase in a sufficient manner. Since the maximum value of the cornering force is small for an excessive steering wheel angle, the tire losses the gripping force and slips laterally. As a result, the lateral acceleration Yg read at the point 106 of FIG. 4 has a small positive value and the maximum yaw rate $(d/dt)\phi^*$MAX calculated at the point 118 of FIG. 4 has a small positive value. When the steering wheel angle $\theta$ read at the point 104 of FIG. 4 increases in the positive direction because of an excessive steering wheel angle, the reference yaw rate $(d/dt)\phi^*$o calculated at the point 116 of FIG. 4 increases in the positive direction. Since it is judged at the point 120 of FIG. 4 that the absolute value $|(d/dt)\phi^*o|$ of the reference yaw rate exceeds the absolute value $|(d/dt)\phi^*$MAX$|$ of the maximum yaw rate, however, the control is transferred from the point 120 of FIG. 4 to the point 124 of FIG. 4 where the target yaw rate $(d/dt)\phi^*1=(d/dt)\phi^*$ is set at the maximum yaw rate $(d/dt)\phi^*$MAX. Because of small cornering forces, the vehicle yaw moment is small and thus the actual yaw rate $(d/dt)\phi$ read at the point 108 of FIG. 4 has a small positive value. For this reason, the yaw rate deviation $\epsilon$ calculated at the point 128 of FIG. 4 will be small. In this case, the rear road wheel steer angle $\delta R^*$ calculated based on the yaw rate deviation $\epsilon$ at the point 130 of FIG. 4 will have a small positive or negative value although it is not clear whether the yaw rate deviation $\epsilon$ is positive or negative. Thus, the rear road wheel steer angle $\delta R$ calculated at the point 132 of FIG. 4 has such a small value as the sum of the small rear road wheel steer angle $\delta R^*$ corresponding to the small yaw rate deviation $\epsilon$ achieved for the low $\mu$ road surface to the rear road wheel steer angle control factor $\delta R^*$o read at the point 114 of FIG. 4. The rear road wheel steer angle difference $\gamma$ of the actual rear road wheel steer angle $\delta RR$ read at the point 112 of FIG. 4 from the rear road wheel steer angle $\delta R$ is calculated at the point 134 of FIG. 4. At the points 136 to 142 of FIG. 4, the control signals Scs1 and Scs2 are produced or interrupted to control the rear road wheels 10RL and 10RR in a direction to zero the rear road wheel steer angle difference $\gamma$.

The rear road wheel steering angle $\delta R^*$ do not have a great value even for an excessive steering wheel angle $\theta$, whereas the rear road wheel steer angle control factor $\delta R^*$ increases as the steering wheel angle increases. For this reason, the relative steer angle between the front and rear road wheels decreases. That is, an in-phase control is made with a great steer angle for the rear road wheels 10RL and 10RR to suppress the vehicle yaw moment so as to prevent unnecessary yaw rate acceleration. This is effective to assure good driving stability. It is to be understood, of course, that for appropriate steering wheel angles including such an excessive steering wheel angle, as great yaw rate as possible on such a low $\mu$ road surface is produced on the vehicle to retain an appropriate vehicle moving line intended by the driver for an appropriate steering wheel angle. Substantially the same road wheel steering control is made when the vehicle turns toward the left except the operations commanded for the left and right rear road wheels 10RL and 10RR are inverted.

Figure 7:
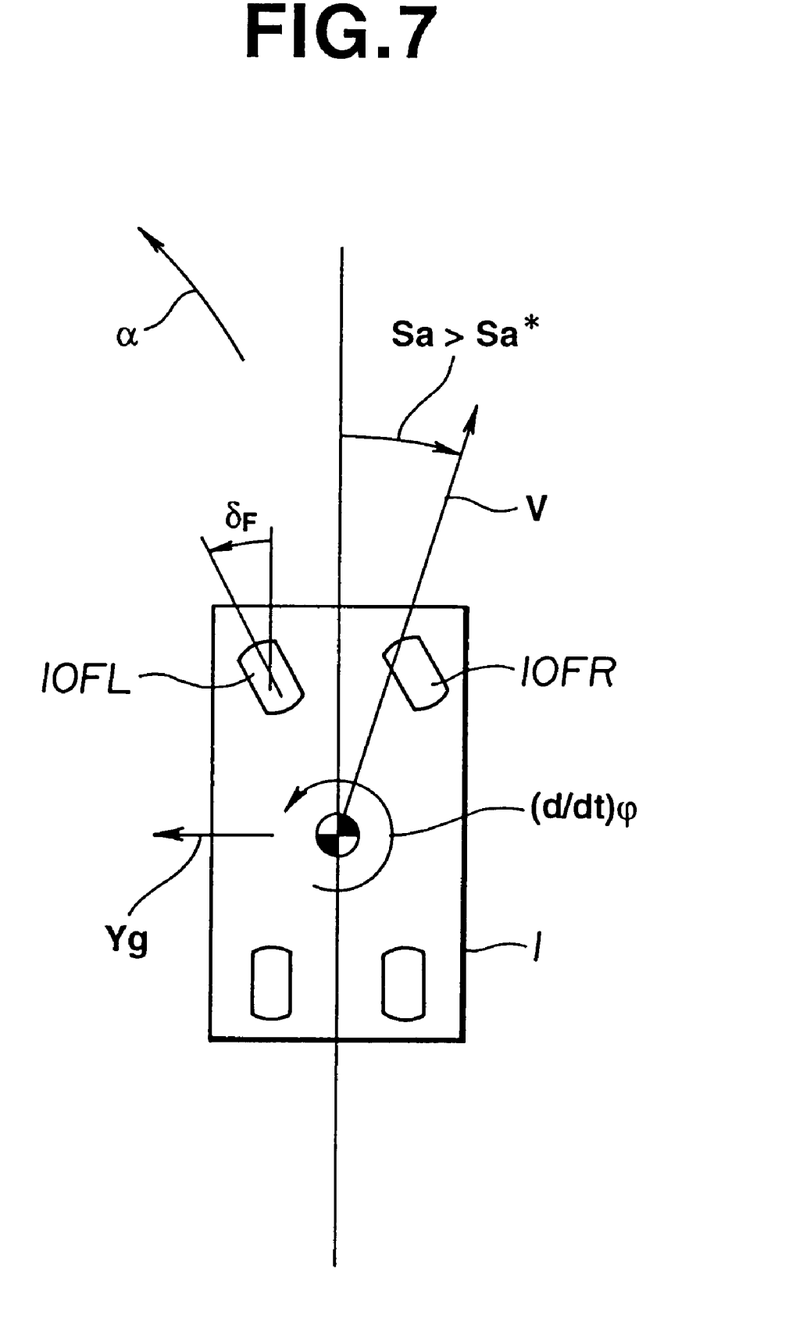
FIG. 7 is a schematic diagram used in explaining the vehicle slip angle, yaw rate and lateral acceleration during vehicle turning movement.

In this embodiment, the target yaw rate $(d/dt)\phi^*1$ determined at the step 122 or 124 of FIG. 4 is not used for the rear road wheel steer angle control and it is corrected, at the point 126 of FIG. 4 (FIG. 6), according to Equation (8). The corrected target yaw rate $(d/dt)\phi^*$ is used for the rear road wheel steer angle control. Equation (8) will be described on an assumption that the vehicle body 1 turns at a vehicle speed V in the direction indicated by the arrow $\alpha$ of FIG. 7 with the front road wheels 10FL and 10FR being steered at an angle $\delta F$ corresponding to as steering wheel angle $\theta$. the produced vehicle yaw rate is $(d/dt)\phi$ and the produced lateral acceleration is Yg. The target yaw rate $(d/dt)\phi^*1$ is corrected when the vehicle slip angle Sa is directed outside with respect to the vehicle turning movement and the vehicle slip angle Sa exceeds a reference slip angle Sa*, as described in connection with FIG. 6.

Figure 8A:
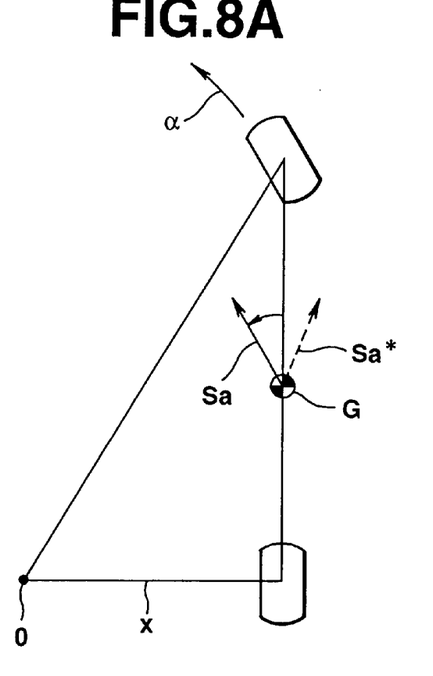
FIG. 8A is a schematic diagram used in explaining the vehicle slip angle during vehicle low-speed movement.
Figure 8B:
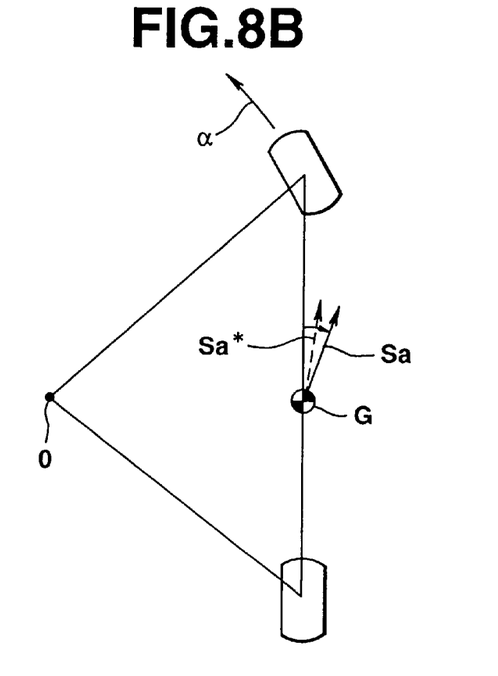
FIG. 8B is a schematic diagram used in explaining the vehicle slip angle during vehicle high-speed movement.

Description will be made as to whether the vehicle slip angle Sa is directed outside or inside with respect to the vehicle turning movement, that is, the direction $\alpha$ to which the vehicle is turning. Assuming now that the vehicle is turning at a low vehicle speed V, for example, 30 Km/h or less, the center O of the vehicle turning movement lies substantially on the line x extending from the axis of the rear road wheels and behind the gravity center G of the vehicle, as shown in FIG. 8A. As a result, the vehicle slip angle Sa is directed inside with respect to the vehicle turning direction $\alpha$. In this case, the target yaw rate $(d/dt)\phi^*1$ can be used without any correction for the rear road wheel steer angle control since the vehicle turning behavior is stable. When the vehicle is turning at a high vehicle speed V, for example, 30 Km/h or more or when lateral sip occurs, the center O of the vehicle turning movement lines in front of the vehicle gravity center G, as shown in FIG. 8B. As a result, the vehicle slip angle Sa exceeds the reference slip angle Sa* and it is directed outside with respect to the direction $\alpha$ in which the vehicle is turning. In this case, the vehicle turning behavior is unstable and the vehicle yawing behavior control would promote the unstable vehicle turning behavior if the target yaw rate $(d/dt)\phi^*1$ is used as it stands without any correction. For this reason, the target yaw rate $(d/dt)\phi^*1$ is corrected to the corrected target yaw rate $(d/dt)\phi^*$ from Equation (8) for use in controlling the rear road wheel steer angle. This correction is made by decreasing the target yaw rate $(d/dt)\phi^*1$ according to an excess of the vehicle slip angle Sa with respect to the reference slip angle Sa*, that is, by correcting it toward the outside of the vehicle turning movement.

Figure 9A:
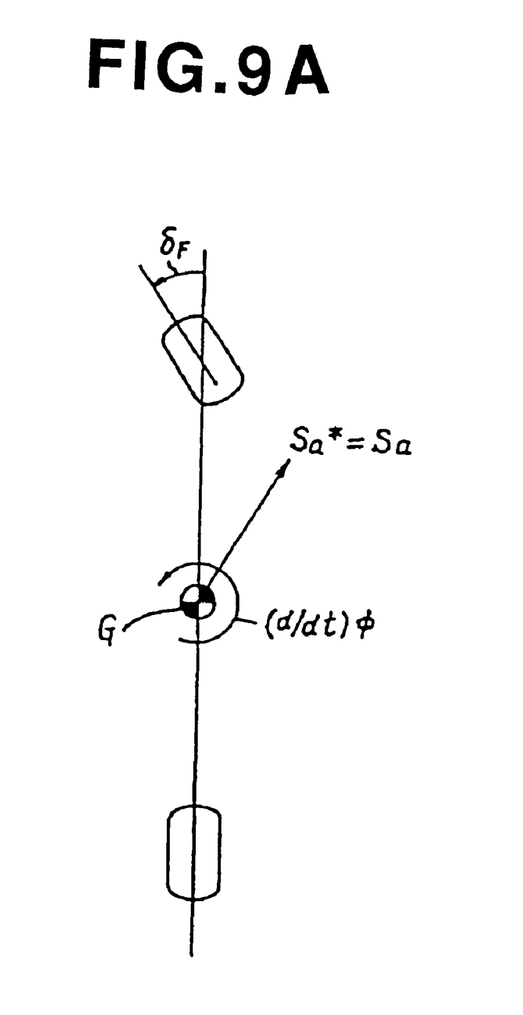
FIG. 9A is a schematic diagram used in explaining the vehicle turning movement with a constant reference slip angle.
Figure 9B:
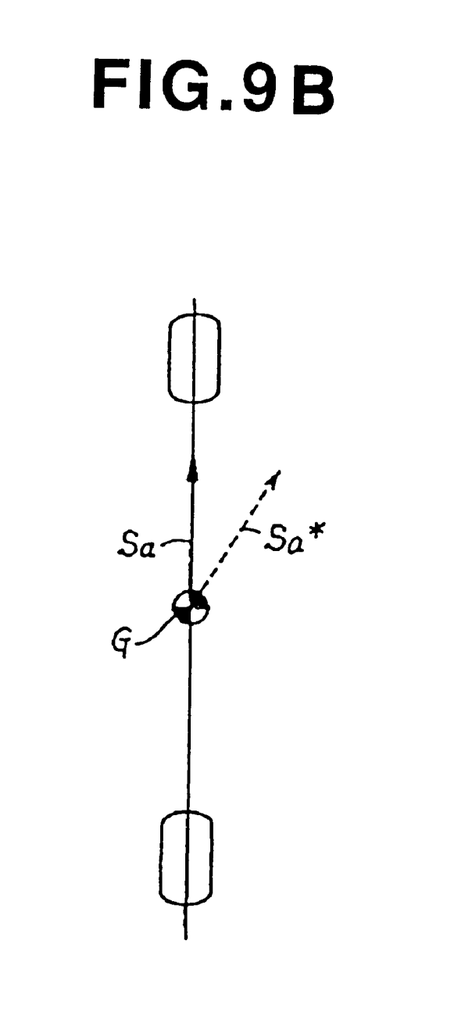
FIG. 9B is a schematic diagram used in explaining the vehicle straight-line movement with a constant reference slip angle.

The reference slip angle Sa* is set at the upper limit of a vehicle slip angle range where the vehicle yawing behavior control cannot cause any unstable vehicle behavior even when the target yaw rate $(d/dt)\phi^*1$ is used as it stands for the rear road wheel steer angle control. However, the following problem would occur if the reference slip angle Sa* is a constant value directed outside with respect to the vehicle turning movement. That is, if the reference slip angle is a constant value directed outside with respect to the vehicle turning movement, the reference slip angle Sa* should be a value greater than the slip angle resulting from a normal yawing motion produced when the steering wheel is turned. If the reference slip angle Sa* set in such a manner is a constant value, for example, as shown in FIGS. 9a and 9B, the control will have no effect to produce a blind zone from a position near the neutral position and discontinuous yawing motion when lateral slip occurs because of disturbance during the vehicle straight-line movement, as shown in FIG. 9B, although no problem occurs when the vehicle is turning to produce a yaw rate (d/dt)φ, as shown in FIG. 9A. The invention solves this problem by modifying the reference slip angle Sa* based on the corrected target yaw rate (d/dt)φ* and the vehicle speed in the following manner:

The Equation of motion of the vehicle is given as:

$$\beta = \{C_{PF}/(C_{PF}+C_{PR})\}\delta_F - \tag{9}$$
$$\{m/2(C_{PF}+C_{PR})\}V\{(d/dt)\beta + (d/dt)\varphi\} -$$
$$\{(L_F C_{PF} - L_R C_{PR})/(C_{PF}+C_{PR})\}\{(d/dt)\varphi\}V$$

$$\beta = \{C_{PF}/(C_{PF}L_F + C_{PR}L_R)\}\delta_f - \tag{10}$$
$$\{I/2(C_{PF}L_F + C_{PR}L_R)\}\{(d^2/dt^2)\varphi\} -$$
$$\{(L_F^2 C_{PF} - L_R^2 C_{PR})/(C_{PF}L_F + C_{PR}L_R)\} \times (d/dt)\varphi\}/V$$

where β is the vehicle slip angle, $C_{PF}$ is the front road wheel cornering power, $C_{PC}$ is the rear road wheel cornering power, m is the inertia mass, V is the vehicle speed, I is the yaw inertia moment and $\delta_F$ is the front road wheel steer angle.

Consideration is made to the steady motion. Since (d/dt)β=0 and $(d^2/d^2)\phi=0$, the target vehicle slip angle β* and the target yaw rate $(d^2/d^2)\phi^*$ are given as:

$$\beta^* = (L_R/L)\delta_F \times 1 - \tag{11}$$
$$(m/2I)(L_F/L_R C_{PR})V^2/\{1-(m/2I^2)(L_F C_{PF}-L_R C_{PR})/C_{PF}C_{PR}V^2\}$$

$$(d/dt)\varphi^* = \{V/L)\delta_F \times 1/\{1-(m/2I^2)(L_F C_{PF}-L_R C_{PR})/C_{PF}C_{PR}V^2\} \tag{12}$$

Because of the steady motion, the yaw rate +(d/dt)φ is equal to the target yaw rate +(d/dt)φ* and the vehicle slip angle β is equal to the target vehicle slip angle β*. It is to be noted that the target vehicle slip angle β* (Sa*) calculated from Equation (11) may be calculated based on the steering wheel angle θ and the vehicle speed V. From Equations (11) and (12), the target vehicle slip angle β* is given as $$\beta^* = \{[L_R-(m/2L)(L_F/C_{PR})V^2]/V\} \times (d/dt)\phi^* \qquad \ldots (13)$$

In this embodiment, the target vehicle slip angle β* calculated from Equation (13) is set as the reference slip angle Sa*. Since the term $\{[L_R-(m/2L)(L_F/C_{PR})V^2]/V\}$ is the function f(V) of vehicle speed V, the reference slip angle Sa* varies according to the vehicle speed V and the target yaw rate (d/dt)φ*. That is, the reference slip angle Sa* increases as the target yaw rate (d/dt)φ* increases during high-speed vehicle turning movement and decreases as the target yaw rate (d/dt)φ* decreases during vehicle straight-line movement. It is, therefore, possible to control the vehicle slip angle within an appropriate range.

According to the invention, when the vehicle slip angle is directed outside with respect to the vehicle turning movement and is greater than the reference slip angle, that is, when the vehicle yawing behavior is unstable, the target vehicle yawing motion value is decreased to a greater degree as deviation of the vehicle slip angle from the reference slip angle increases. Put another way, the more the deviation increases, the more the target value decreases. It is, therefore, possible to prevent the target vehicle yawing motion value from being unchanged to prompt the unable vehicle yawing behavior upon occurrence of lateral slip. Since the reference slip angle is corrected to increase as the target vehicle yawing motion value increases, the target vehicle yawing motion value is corrected automatically according to the vehicle turning movement.

What is claimed is:

1. An apparatus for controlling the yawing behavior of an automotive vehicle supported on a pair of front road wheels and a pair of rear road wheels, comprising:

means for sensing parameters representing a condition of vehicle movement;

means for calculating a target value for vehicle yawing motion based on the sensed parameters;

means for detecting at least vehicle yaw rate and vehicle slip angle representing an actual value of vehicle yawing motion; and a control unit for controlling the vehicle behavior to bring the actual vehicle yawing motion value into agreement with the calculated target value, the control unit including means for producing a control signal when the detected vehicle slip angle is directed outside with respect to a circle in which the vehicle is turning and is greater than a reference slip angle, means responsive to the control signal for correcting the calculated target vehicle yawing motion value to a greater degree outside with respect to the circle in which the vehicle is turning as a deviation of the detected vehicle slip angle from the reference slip angle increases, and means for increasing the reference slip angle as the calculated target vehicle yawing motion value increases.

2. The vehicle yawing behavior control apparatus as claimed in claim 1, wherein the control unit includes means for setting the reference slip angle Sa* as:

$$Sa^* = \{[L_R-(m/2L)(L_F/C_{PR})V^2]/V\} \times (d/dt)\phi^*$$

where $L_R$ is the distance between the rear road wheels and the center of gravity of the vehicle, $L_F$ is the distance between the front road wheels and the center of gravity of the vehicle, L is the wheelbase of the vehicle, m is the inertia mass of the vehicle, $C_{PR}$ is the cornering power of the rear road wheels, V is the vehicle speed, and (d/dt)φ* is the target vehicle yawing motion value.

3. The vehicle yawing behavior control apparatus as claimed in claim 2, wherein the control unit includes:

means for sensing a vehicle speed;

means for sensing a steering wheel angle;

means for sensing a vehicle lateral acceleration;

means for calculating a reference yaw rate based on the sensed steering wheel angle and vehicle speed;

means for calculating a maximum yaw rate based on the sensed lateral acceleration and the vehicle speed;

means for comparing an absolute value of the calculated reference yaw rate with an absolute value of the calculated maximum yaw rate;

means for setting the target yaw rate at the calculated reference yaw rate when the absolute value of the calculated reference value is equal to or greater than the absolute value of the calculated maximum yaw rate and at the calculated maximum yaw rate when the absolute value of the calculated reference value is less than the absolute value of the calculated maximum yaw rate.

4. The vehicle yawing behavior control apparatus as claimed in claim 3, wherein the calculated reference yaw rate increases as the steering wheel angle increases and the vehicle speed decreases.

5. The vehicle yawing behavior control apparatus as claimed in claim 3, wherein the control unit includes:

means for calculating a rear road wheel steer angle based on the deviation of the detected vehicle slip angle from the reference slip angle; and means for steering the rear road wheels according to the calculated rear road wheel steer angle.

6. The vehicle yawing behavior control apparatus as claimed in claim 5, wherein the calculated rear road wheel steer angle is substantially in direct proportion to the deviation of the detected vehicle slip angle from the reference slip angle.

7. The vehicle yawing behavior control apparatus as claimed in claim 3, wherein the control unit includes:

means for comparing an absolute value of the detected vehicle slip angle with a reference vehicle slip angle value;

means for correcting the target yaw rate from the following equation:

$$(d/dt)\phi^* = (d/dt)\phi^*1 - Ki(|Sa| - Sa^*)$$

where $(d/dt)\phi^*$ is the corrected target yaw rate, $(d/dt)\phi^*1$ is the calculated target yaw rate, Ki is a constant, Sa is the detected vehicle slip angle, and Sa* is the reference slip angle.

8. In an apparatus for controlling an automotive vehicle when the vehicle is turning a circle, including yawing behavior control means having a control element positionable in response to a control signal to establish various positions of the vehicle against surrounding circumstances and control unit means for developing the control signal to reduce a deviation of an actual yawing motion value from a target yawing motion value toward zero, the improvement wherein the control unit means inputs information of a slip angle of the vehicle and a yaw rate of the vehicle;

the control unit means determines whether the input slip angle indicates that the vehicle moves in a direction outward of the circle in which the vehicle turns;

the control unit means determines whether the input slip angle is greater than a reference slip angle;

the control unit means calculates a deviation of the input slip angle from the reference slip angle;

the control unit means corrects the calculated target yawing motion value at a rate, with respect to time, determined by the calculated deviation and in such a direction as to cause the vehicle to move outward of the circle in which the vehicle turns upon determination that the direction in which the vehicle moves points outward of the circle in which the vehicle turns and that the input slip angle is greater than the reference slip angle; and the control unit means increases the reference slip angle with an increase in the calculated target yawing motion value.

9. The improvement as claimed in claim 8, wherein the control unit means stores a control map which specifies various values of a reference yaw rate against various combinations of a vehicle speed of the vehicle and a steering angle; and wherein the control unit means calculates a reference yaw rate for a given combination of the vehicle speed and the steering wheel angle.

10. The improvement as claimed in claim 9, wherein the control unit means calculates a maximum yaw rate as a function of lateral acceleration and vehicle speed;

the control unit means determines whether or not the absolute value of the calculated yaw rate is less than or equal to the absolute value of the calculated maximum yaw rate;

the control unit means sets the target yaw rate at the calculated reference yaw rate after determining that the absolute value of the calculated yaw rate is less than or equal to the absolute value of the calculated maximum yaw rate; and the control unit means sets the target yaw rate at the calculated maximum yaw rate after determining that the absolute value of the calculated yaw rate is not less than nor equal to the absolute value of the calculated maximum yaw rate.

11. The improvement as claimed in claim 10, wherein the control unit means calculates a rear road wheel steer angle based on a yaw rate deviation.

12. The improvement as claimed in claim 11, wherein the control unit means stores a control map which specifies various values of a rear road wheel steer angle against various values of a yaw rate deviation.

13. The improvement as claimed in claim 12, wherein the control unit means determines an appropriate value of the rear road steer angle against a given value of the yaw rate deviation.

14. The improvement as claimed in claim 13, wherein the rear road wheel steer angle is proportional to the yaw rate deviation within a window limited by a negative lower limit value and a positive upper limit value;

the rear road wheel steer angle is fixed over various values of the yaw rate deviation greater than the positive upper limit value; and the rear road wheel steer angle is fixed over various values of the yaw rate deviation less than the negative lower limit value.

15. The improvement as claimed in claim 8, wherein the control unit means determines whether or not the absolute value of the vehicle slip angle is greater than the reference slip angle;

the control unit means leaves the target yaw rate uncorrected after determining that the absolute value of the vehicle slip angle is not greater than the reference slip angle; and the control unit means effects the correction of the target yaw rate after determining that the absolute value of the vehicle slip angle is not greater than the reference slip angle.

16. The improvement as claimed in claim 9, wherein, with the vehicle speed unchanged, the reference yaw rate increases with an increase in the steering wheel angle and gradually levels off to reach a predetermined value as the steering wheel angle increases, and the absolute value of the predetermined value decreases as the vehicle speed increases.

* * * * *